(12) United States Patent
Anikitchev et al.

(10) Patent No.: US 7,272,956 B1
(45) Date of Patent: Sep. 25, 2007

(54) METHOD FOR MANUFACTURING A MULTIMODE FIBER PUMP POWER COMBINER

(75) Inventors: Serguei G. Anikitchev, Belmont, CA (US); Kevin Elton Lindsay, Newmarket (CA); Andrei Starodoumov, Cupertino, CA (US)

(73) Assignee: Coherent, Inc., Santa Clara, CA (US)

( * ) Notice: Subject to any disclaimer, the term of this patent is extended or adjusted under 35 U.S.C. 154(b) by 644 days.

(21) Appl. No.: 10/902,976

(22) Filed: Jul. 30, 2004

(51) Int. Cl.
*C03B 37/028* (2006.01)

(52) U.S. Cl. .............................. 65/409; 65/406; 65/408; 65/410; 385/115

(58) Field of Classification Search .................. 65/409, 65/406, 408, 410, 411, 412; 385/115, 43, 385/48, 123–127, 141–142
See application file for complete search history.

(56) References Cited

U.S. PATENT DOCUMENTS 5,864,644 A  1/1999  DiGiovanni et al. .......... 385/43

*Primary Examiner*—Steven P. Griffin
*Assistant Examiner*—Queenie Dehghan
(74) *Attorney, Agent, or Firm*—Stallman & Pollock LLP

(57) ABSTRACT

A multimode to low-mode optical fiber is constructed by forming a plurality of multimode optical fibers into a fiber bundle. The bundle is then selectively heated and drawn to form a bi-tapered fiber bundle having a central straight portion in which the multimode fibers are fused into a single length of fiber. During the drawing step, measures are taken to provide an aperture extending through the bi-tapered bundle, including the single straight portion of the bundle. An optical fiber having a low-mode or single-mode core is inserted through the aperture into the straight section of the bi-tapered bundle. The bi-tapered bundle and the low-mode core fiber are heated to a temperature at which cladding of the low-mode core fiber fuses to the straight portion of the bi-tapered bundle. The bi-tapered bundle is then cleaved in the straight portion to provide the multimode to low-mode optical fiber combiner. In one example, the multimode fiber bundle is formed around a metal wire before the drawing operation. After the drawing operation the wire is extracted from the bi-tapered bundle leaving the aperture in the bi-tapered bundle.

29 Claims, 10 Drawing Sheets

METHOD FOR MANUFACTURING A MULTIMODE FIBER PUMP POWER COMBINER

TECHNICAL FIELD OF THE INVENTION

The present invention relates generally to methods of pumping optical fiber amplifiers. The invention relates in particular to pumping optical fiber amplifiers with light delivered via a plurality of multimode optical fibers.

DISCUSSION OF BACKGROUND ART

A common form of optical fiber amplifier includes a doped low-mode core surrounded by an inner cladding layer and an outer cladding layer. Optical pump light, is directed into the inner cladding layer, propagates along the fiber and is progressively absorbed in the doped core. The absorbed pump light energizes the core to provide optical gain. Light to be amplified, either from a fiber laser or from another fiber amplifier is coupled into the low-mode core of the amplifier fiber and is amplified as it propagates along the core.

The terminology "low-mode" as applied to optical fibers described herein refers to a fiber having a core diameter sufficiently small compared with the wavelength of light to be propagated or amplified therein, such that the light will propagate in no more than about four different modes. A single-mode fiber is a particular case of such a low-mode fiber in which the core diameter of the fiber is sufficiently small that the light will propagate in only one mode. The terminology "multimode" as applied to optical fibers described herein refers to a fiber having a core diameter sufficiently large compared with the wavelength of light to be propagated or amplified therein, such that the light will propagate therein in hundreds of different modes.

In one preferred prior art arrangement, described in U.S. Pat. No. 5,864,644, granted to DiGiovanni et al., pump light is provided by a plurality of multimode diode-lasers via a corresponding plurality of multimode optical fibers. Light for each of the diode lasers is coupled into a corresponding one of the multimode optical fibers. Light to be amplified (the signal) is transmitted along a low-mode optical fiber. The multimode fibers and the low-mode fiber are free at one end thereof. At the opposite end, the multimode fibers are bundled around the low-mode fiber and the bundle is fused and tapered to provide a single length of fiber. The fused tapered bundle including the single length of fiber is generally referred to as a combiner or multiplexer.

The single length of fiber of the combiner has a low-mode core along which the signal propagates. The low-mode core is surrounded by a cladding, including grouped distorted cores of the multimode fibers. Light from the grouped, distorted cores spills into the cladding and propagates through the cladding.

The overall diameter of the single length of fiber of the combiner is selected to be about equal to the diameter of the inner cladding of the amplifier fiber. The single length of fiber of the combiner is aligned with an input end of the amplifier fiber and butt-spliced thereto. Signal light from the low-mode core of the combiner is coupled into the low-mode core of the amplifier fiber. Pump light from the cladding of the single length of fiber of the combiner is coupled into the inner cladding of the amplifier fiber.

A problem with the signal and pump light coupling of DiGiovanni et al. is that transfer of signal light energy from the low-mode core of the combiner to the low-mode core of the amplifier fiber is often inefficient. This transfer inefficiency results from two effects. A first of these effects is optical loss due to a mismatch between the mode-field diameter (core diameter) of the combiner and the mode-field diameter (core diameter) of the amplifier. This mismatch results from the method by which the combiner of DiGiovanni et al. is formed, a brief description of which is set forth below with reference to FIG. 1A and FIG. 1B.

FIG. 1A schematically illustrates a fused, bi-tapered bundle 10 of optical fibers. In forming fused tapered bundle 10, six multimode fibers 12, each thereof having a multimode core 14 surrounded by cladding 15, are grouped around a low-mode fiber 16 having a low-mode core 18 surrounded by cladding 19. The fused tapered bundle includes two fused and tapered portions 20 located on either side of a central straight portion 22, which is essentially a single fiber having a low-mode core. The fused, tapered bundle is formed by selectively heating an original bundle of the fibers and applying tension to the bundle to form the tapered and straight portions.

After the fused bi-tapered bundle is formed, straight portion 22 thereof is cleaved to provide a single fused tapered bundle 11 (see FIG. 1B) having one tapered portion 20 and a straight portion 23 which functions as a single length of fiber having a low-mode core 18 and a cladding 25 comprising fused-together claddings 15 and 19 of the multimode and low-mode fibers and tapered distorted cores 14 of the original multimode fibers 12. Fused tapered bundle 11 is one example of the above-discussed combiner. Core 18 is tapered in thickness as a result of the tapering process as indicated by dashed lines 18.

Continuing with reference to FIG. 1B, combiner 11 is configured to couple signal light and pump light into an amplifier fiber 30, only a short length of which is depicted in FIG. 1B for convenience of illustration. This is usually effected by butt splicing the combiner to the amplifier fiber, however, for purposes of illustration, the combiner and the amplifier fiber are depicted in FIG. 1B as separated. Amplifier 30 has a doped, low-mode core 32. Core 32 is surrounded by an inner cladding 34. Inner cladding 34 is surrounded in turn by an outer cladding 36. In order to optimally transfer pump light from cladding 25 of combiner 11 to inner cladding 34 of amplifier fiber 30, the diameter of straight portion 23 of the combiner is matched to the diameter of inner cladding 34 of the amplifier fiber. In order to optimally transfer signal light from low-mode core 18 of combiner 11 to low-mode core 32 of amplifier fiber 30, the diameter of core 18 of the combiner should also be matched to the diameter of core 32 of the amplifier fiber.

In order to optimally transfer signal light from low-mode core 18 of combiner 11 to low-mode core 32 of amplifier fiber 30, the mode field diameter of the signal in the tapered fiber must match the mode field diameter of the signal in core 32 of the amplifier 30. For a step-index core profile, the mode-field diameter changes non-monotonically with reduction of the core diameter. At some point in the reduction the mode-field diameter has a minimum, but then grows with further reduction of the core diameter. As a result, a tapered fiber length can be chosen in such a way that mode-field diameter of the tapered fiber 18 is equal to the mode-field diameter of the core 32 complicated and requires changes in the tapering process for any fiber with some development.

The second effect influencing signal performance degradation is stress provided by fused multimode fibers. To provide better fusing of multimode fibers they are twisted around the central fiber. Such a twist, however, induces stresses in the central fiber and may cause loss of signal power. When the central fiber is a single-mode, polarizationmaintaining, or large-mode area fiber with low numerical aperture, the stress induced by the twisting adversely affects both the 140 degree of polarization and loss.

There is a need for a cost effective method of assembling a multimode pump light fiber combiner including a signal light carrying, low-mode core having the same diameter at input and output ends thereof. The method should minimize stresses in the low-mode-core.

SUMMARY OF THE INVENTION

Deficiencies of the prior-art are overcome by adding a low mode core to a multimode fiber combiner after the multimode fibers are tapered and fused together. By this approach, the low-mode core is not tapered and can be matched in diameter to an amplifier core. Further, as no twisting force is applied to the core, above described losses due to stress induced polarization changes can be essentially eliminated.

In one aspect, a method in accordance with the present invention for forming a multimode to single mode optical fiber combiner comprises forming a bundle of multimode optical fibers into an elongated bi-tapered fiber bundle. The bi-tapered bundle has free ends of the multimode fibers at opposite ends thereof. The bi-tapered fiber bundle, between the opposite ends thereof, has two fused tapered portions tapered into a single straight portion and the bi-tapered fiber bundle having an aperture extending longitudinally therethrough. An optical fiber having a low-mode core is inserted into the aperture-including, bi-tapered bundle via the aperture therein. The low-mode-core optical fiber extends at least through the straight portion of the bi-tapered bundle. The bi-tapered bundle having the low-mode-core fiber therein is heated to a temperature at which cladding of the low-mode core optical fiber is fused to the straight portion of the bi-tapered bundle. The bi-tapered bundle having the low-mode core optical fiber therein is cleaved in the straight portion thereof, thereby providing at least one single-tapered multimode to low mode optical fiber combiner. The optical fiber combiner has free ends of the multimode fibers and a free end of the low-mode core fiber at one end thereof. The multimode fibers being fused and tapered together into a single straight portion of the combiner at an opposite end thereof. The low-mode fiber core extends through the straight portion of the combiner.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain the principles of the present invention.

DETAILED DESCRIPTION OF THE INVENTION

Figure 1A:
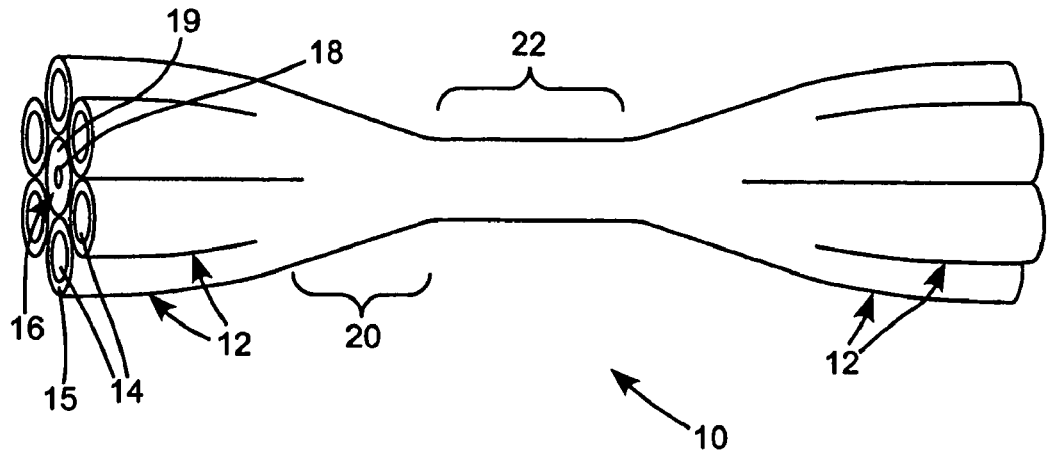
FIG. 1A schematically illustrates a prior-art fused, bi-tapered bundle of six multimode fibers and one low-mode fiber.
Figure 1B:
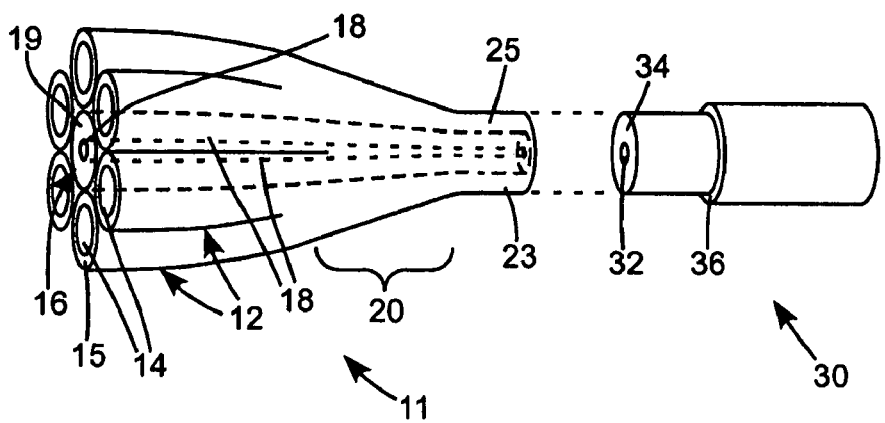
FIG. 1B schematically illustrates one example of a multimode to low-mode combiner cut from the bi-tapered bundle of FIG. 1A.

Returning now to the drawings, in which like features are designated by like reference numerals, a description of one preferred embodiment of a method in accordance with the present invention for assembling a multimode pump light fiber combiner including a signal light carrying, low-mode core having the same diameter at input and output ends thereof is set forth below with reference to FIGS. 2A through 2H.

In one step of the inventive method (see FIG. 2A) a plurality of multimode fibers 12 (here, six fibers) is grouped into a straight bundle 11, around a metal wire 40 having a higher melting point than the material of the optical fibers and preferably having a coefficient of expansion greater than that of the material of the fibers. Suitable metals for wire 40 include platinum (Pt) and tungsten (W), with tungsten being particularly preferred.

Bundled fibers 12 are selectively heated between opposite ends of the bundle to a temperature at which the multimode fibers will fuse together but less than the softening temperature of the metal wire. Tension is applied to fiber bundle 11, pulling the fiber bundle into a fused, bi-tapered bundle (see FIG. 2B) similar to above described bundle 10 of FIG. 1A, but without the central low-mode fiber. Bundle 38 has fused tapered portions 20, and a straight, narrowest diameter portion 22. Narrowest diameter portion 22 of bi-tapered bundle 38 comprises fused-together claddings 15 and distorted cores 14 of the original multimode fibers 12 all collapsed onto wire 40. After fused, bi-tapered bundle 38 is cooled, wire 40 is withdrawn (see FIG. 2C) leaving a cylindrical aperture of uniform diameter (indicated in FIG. 2C parallel by dashed lines 42) extending through the bundle.

Figure 2A:
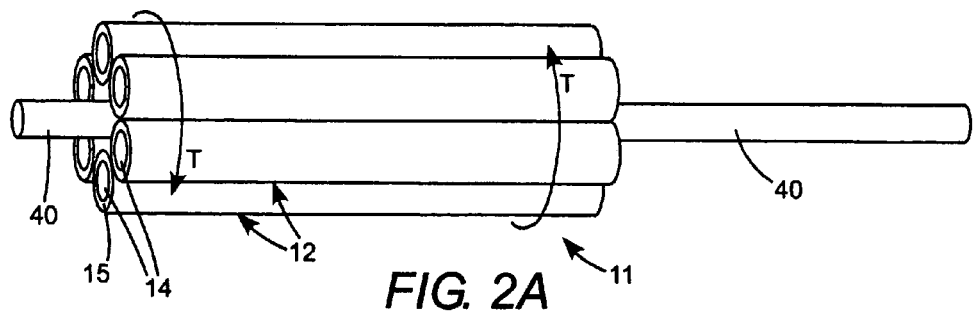
FIGS. 2A-H schematically illustrate steps in a method in accordance with the present invention for making a multimode to low-mode combiner and coupling the low-mode fiber to a fiber amplifier.
Figure 2B:
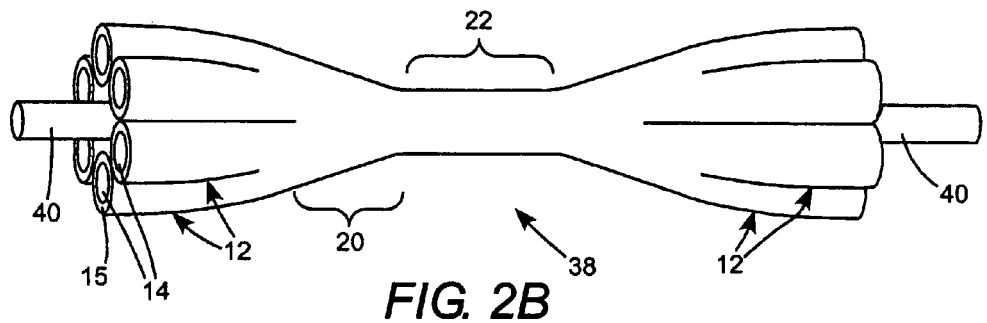
Figure 2C:
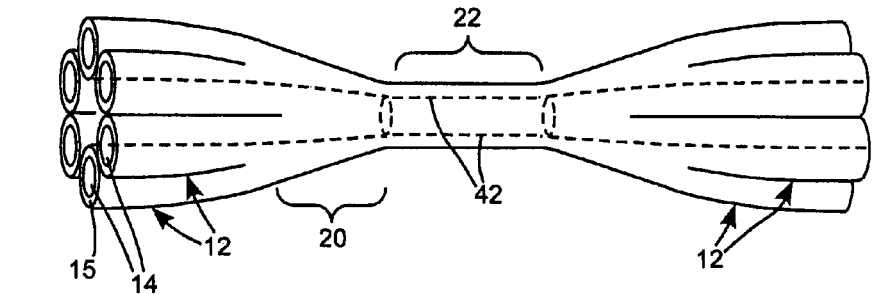

Preferably, during the tensioning step, a twisting force is applied to the fiber bundle as illustrated in FIG. 2A by arrows T. This can result in a twist in the fused tapered bundle. Such a twist, however, does not adversely affect optical properties of the fused tapered bundle, and is not depicted in the drawings for convenience of illustration. Applying the twisting force has been found to aid in packing the individual fibers and encouraging the fibers to fuse together. It has also been found advantageous to heat wire 40 prior to and during the tensioning step. This has been found to facilitate withdrawing wire 40 after the fused tapered bundle has cooled and to prevent heat loss through the wire. Heating of the wire can be effected simply by passing an electrical current therethrough.

Figure 2D:
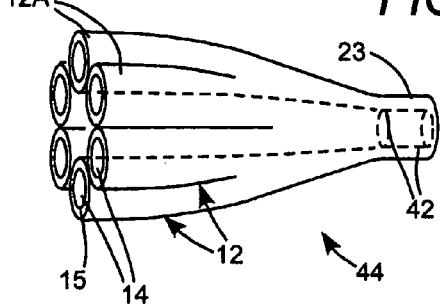
Figure 2E:
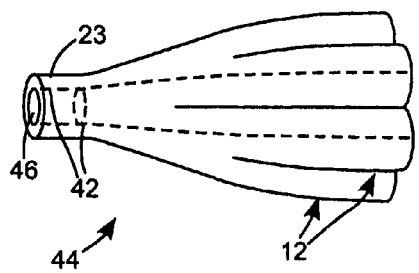

After the fused tapered bundle 38 has cooled and wire 40 has been withdrawn, the fused tapered bundle is then cleaved in narrowest portion 22 thereof to provide a fused, single-tapered bundle 44 (see FIGS. 2D and 2E) having cylindrical aperture 42 extending therethrough. In FIG. 2D single-tapered bundle 44 is seen from a viewpoint that reveals detail of free ends 12A of original fibers 12. These free ends 12A serve as multimode input ports for pump light in a completed combiner. In FIG. 2E, single-tapered bundle 44 is seen from a viewpoint that reveals detail of a narrowest portion 23 of the combiner including an opening 46 corresponding to aperture 42 extending therethrough.

Figure 2F:
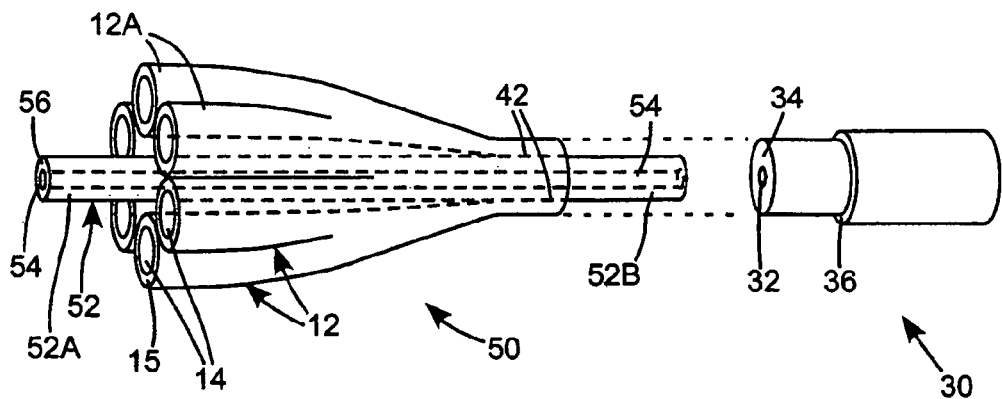
Figure 2G:
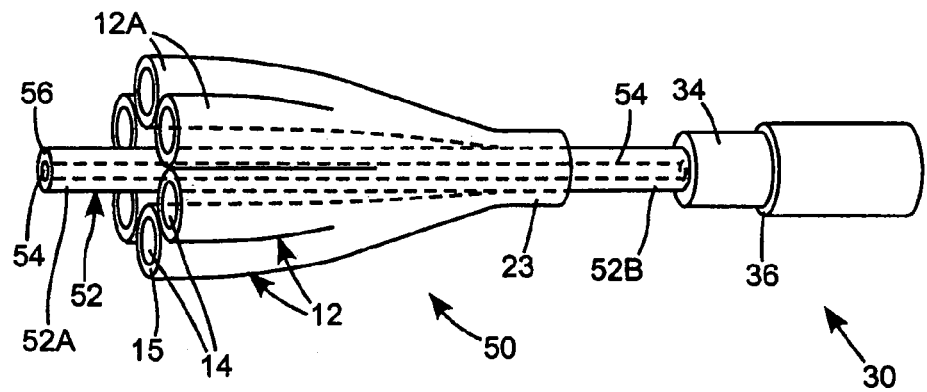

Referring to FIG. 2F, a completed combiner 50 is provided by inserting through single-tapered bundle 44, via opening 46 and cylindrical aperture 42 therein, a low-mode fiber 52 having a low-mode core 54 surrounded by cladding 56. The overall diameter (core plus cladding) of fiber 52 is preferably selected to be about equal to or slightly less than the diameter of aperture 42. This should be the closest fit that can be achieved without causing damage to fiber 52 during the insertion procedure. In order to facilitate insertion of the fiber 52 in aperture 42 it may be found convenient to slightly reduce the diameter of one end of the fiber. This could be effected by a chemical etching process or the like.

Figure 2H:
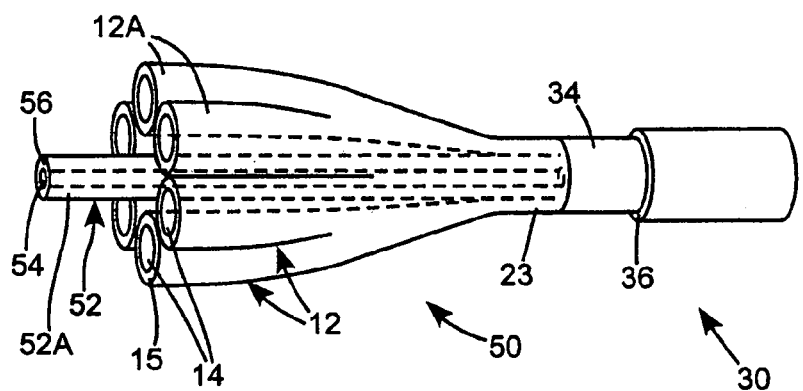

In the completed combiner 50, end 52A of fiber 52 serves as a signal port or signal-input port of the combiner. End 52B serves as the signal-output port to an above-described fiber amplifier 30. End 52B can be considered a single section of fiber having a cladding comprising the original cladding of the low-mode core fiber plus the fused-together original claddings 15 and cores 14 of multimode fibers 12. The diameter of core 54 of fiber 52 is preferably the same diameter as doped-core 32 of the amplifier fiber to achieve optimum mode-matching. The combiner 50 can be coupled to the fiber amplifier by splicing output end 52B of low-mode fiber 52 to amplifier fiber 30 with core 32 of fiber 30 aligned with core 54 of fiber 52 (see FIG. 2G). Straight portion 23 of combiner 50 can then be butt-spliced to amplifier fiber 30 as indicated in FIG. 2H. Alternatively, combiner 50 including fiber 52 can be spliced to the amplifier fiber in a single operation.

A description of another preferred embodiment of a method in accordance with the present invention for assembling a multimode pump-light fiber combiner including a signal-light carrying, low-mode core having the same diameter at input and output ends thereof is set forth below with reference to FIGS. 3A through 3G.

In one step of the inventive method (see FIG. 3A), a plurality of multimode fibers 12 is grouped into a straight bundle 13, around a hollow fiber or capillary tube 71 having a thin metal rod or wire 40 extending therethrough. Metal wire 40 has a higher melting point than the material of the optical fibers and preferably has a coefficient of expansion greater than that of the material of the fibers as discussed above The bundle of fibers 12 and hollow fiber 71 is pulled into a fused, bi-tapered bundle (see FIG. 3B) 72. Bundle 72 has fused tapered portions 20, and a straight or narrowest portion 22. Narrowest portion 22 comprises fused-together claddings 15 and tapered distorted cores 14 of the original multimode fibers 12 fused with hollow fiber 71, all collapsed onto wire 40. Here again, a torque or twisting force is preferably applied to the fiber bundle as it is being pulled and wire 40 is preferably heated during the pulling operation. Bundle 72 is then cooled. Preferably, after bundle 72 is cooled, wire 40 is withdrawn from hollow fiber 71 (see FIG. 3C). Extending through bundle 72, including narrowest portion 22 of bundle 72, there will be a cylindrical aperture 74 of uniform diameter, indicated in FIG. 3C by parallel dashed lines.

Figure 3A:
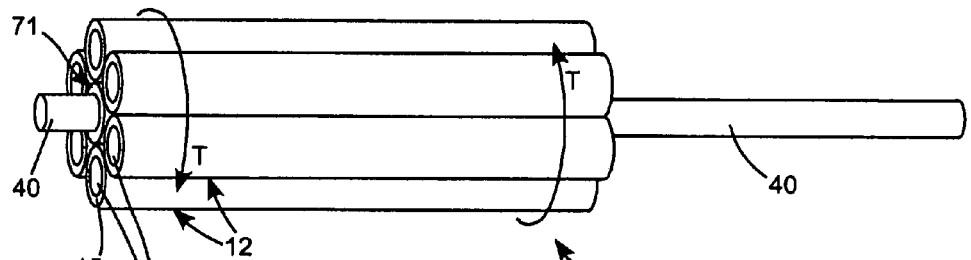
FIGS. 3A-G schematically illustrate steps in another method in accordance with the present invention for making a multimode to low-mode combiner and coupling the low-mode fiber to a fiber amplifier.
Figure 3B:
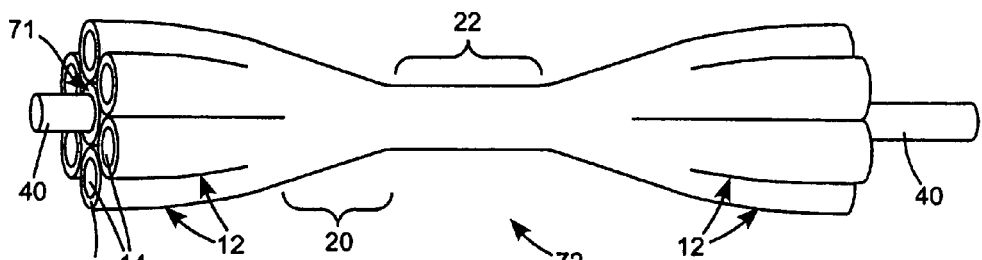
Figure 3C:
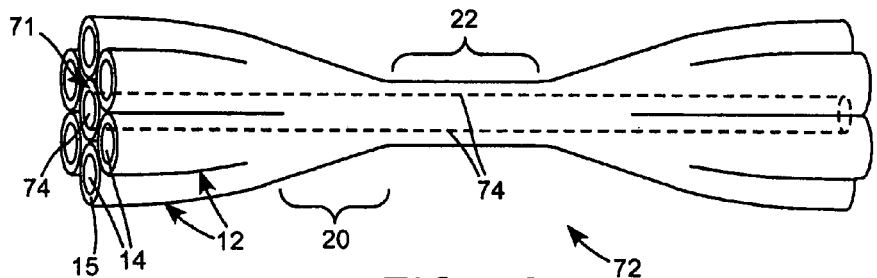
Figure 3D:
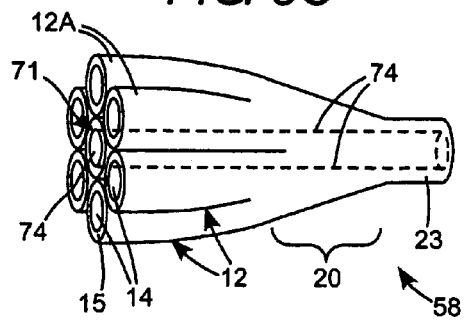

Bi-tapered bundle 72 is then cleaved in narrowest portion 22 thereof to provide a fused, single-tapered bundle 58 (see FIG. 3D) having cylindrical aperture 74 extending therethrough. In FIG. 3D the partially completed combiner is seen from a viewpoint that reveals detail of free ends 12A of original fibers 12. These free ends 12A serve as multimode input ports for pump light in a completed combiner.

Figure 3E:
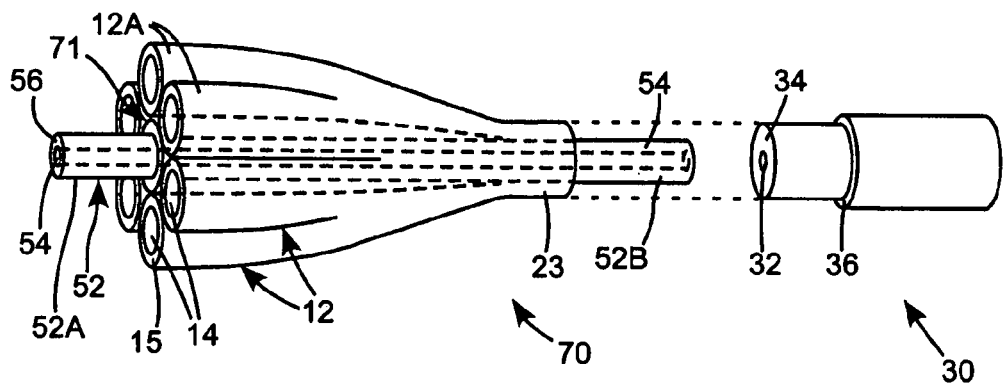
Figure 3F:
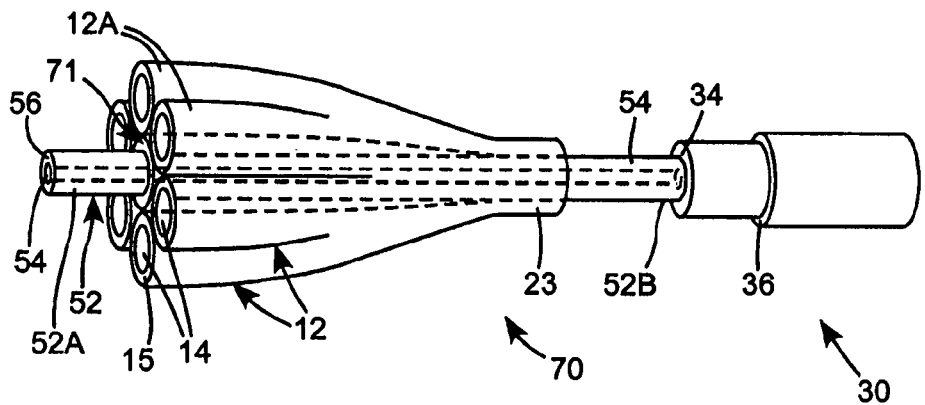

Referring to FIG. 3E, a completed combiner 70 is provided by inserting through partially completed combiner 58, via cylindrical aperture 74 therein, a low-mode fiber 52 having a low-mode core 54 surrounded by cladding 56. The configuration and dimensions of fiber 52 are as discussed above with respect to combiner 50 of FIGS. 2F-H.

Figure 3G:
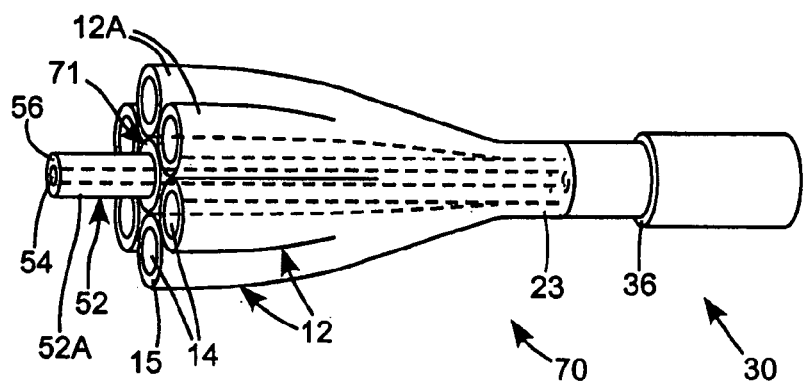

In the completed combiner 70, as in combiner 50, end 52A of fiber 52 serves as a signal port or signal-input port of the combiner. End 52B serves as the signal-output port to an above-described fiber amplifier 30. The diameter of core 54 of fiber 52 is preferably the same diameter as doped-core 32 of the amplifier fiber to achieve optimum mode-matching. The combiner 70 can be coupled to the fiber amplifier by splicing output end 52B of low-mode fiber 52 to amplifier fiber 30 with core 32 of fiber 30 aligned with core 54 of fiber 52 (see FIG. 3F). Straight portion 23 (that which remains of straight portion 22 of a bi-tapered bundle after cleaving) of combiner 70 is then butt spliced to amplifier fiber 30 as indicated in FIG. 3G. Alternatively, combiner 70 including fiber 52 can be spliced to the amplifier fiber in a single operation.

Figure 4A:
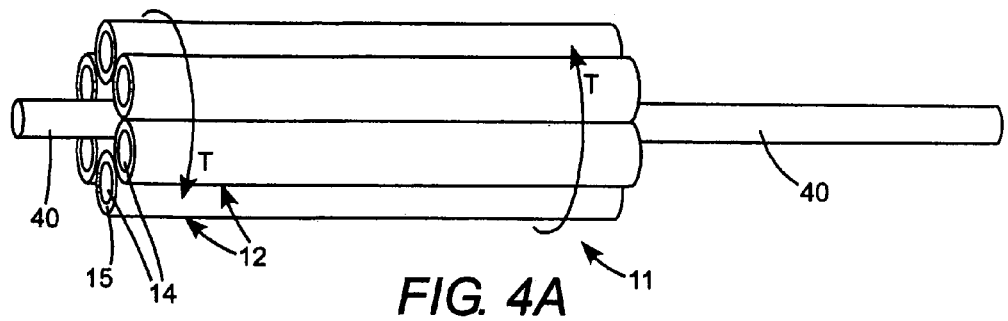
FIGS. 4A-F schematically illustrate steps in a yet another method in accordance with the present invention for making a multimode to low-mode combiner and coupling the low-mode fiber to a fiber amplifier.
Figure 4B:
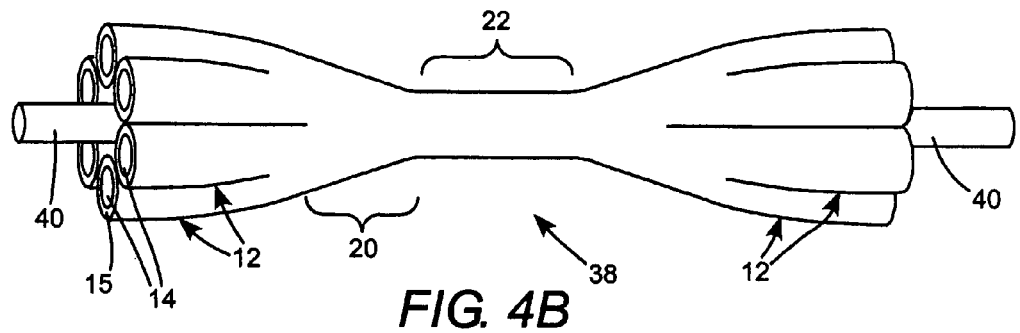
Figure 4C:
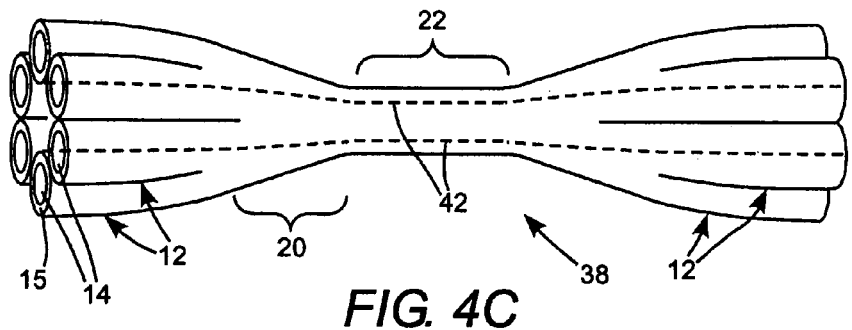
Figure 4D:
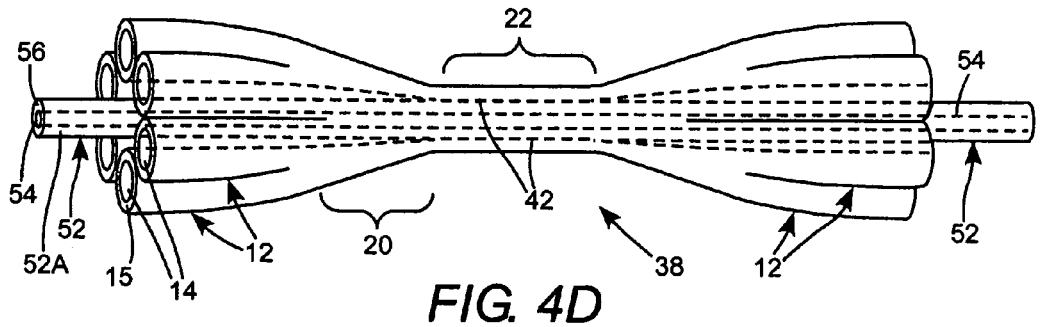

A description of yet another preferred embodiment of a method in accordance with the present invention for assembling a multimode pump-light fiber combiner including a signal-light carrying, low-mode core having the same diameter at input and output ends thereof is set forth below with reference to FIGS. 4A through 4F. First, a bi-tapered bundle 38 having an aperture 42 extending therethrough is formed as described above with reference to FIGS. 2A-C (see FIGS. 4A-C). A low-mode fiber 52 having a core 54 surrounded by cladding 56 is then inserted through fused tapered bundle 38 via aperture 42 thereof (see FIG. 4D). Fiber 52 should extend at least through straight portion 22 of the fused tapered bundle and preferably should extent completely through the fused tapered bundle as depicted in FIG. 4D. Preferably, the assembly of bundle 38 and fiber 52 is then heated, in a central region thereof about straight portion 22, to a temperature a few degrees above the softening point of the fiber material in order to fuse low-mode fiber 52 to straight portion 22 of bundle 38. After the fusion is completed, the assembly is preferably left to cool. Here it should be noted that a similar heating of a finished combiner made by the methods of FIGS. 2A-D and FIGS. 3A-D could be performed to fuse the low mode fiber cladding to surrounding cladding.

Figure 4E:
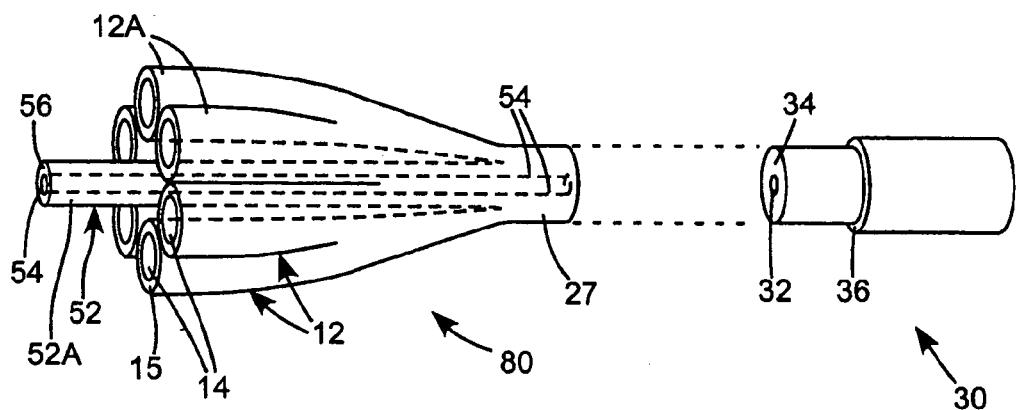
Figure 4F:
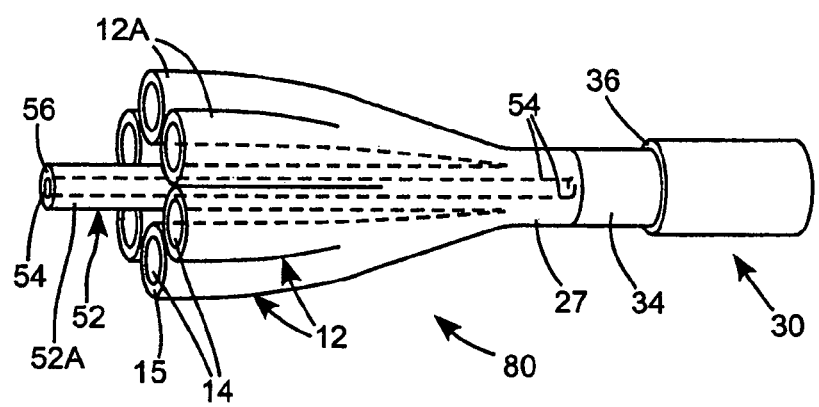
Figure 5A:
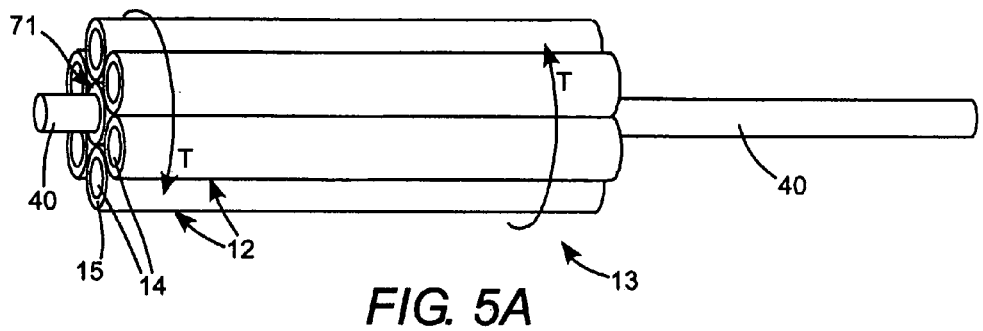
FIGS. 5A-F schematically illustrate steps in still another method in accordance with the present invention for making a multimode to low-mode combiner and coupling the low-mode fiber to a fiber amplifier.
Figure 5B:
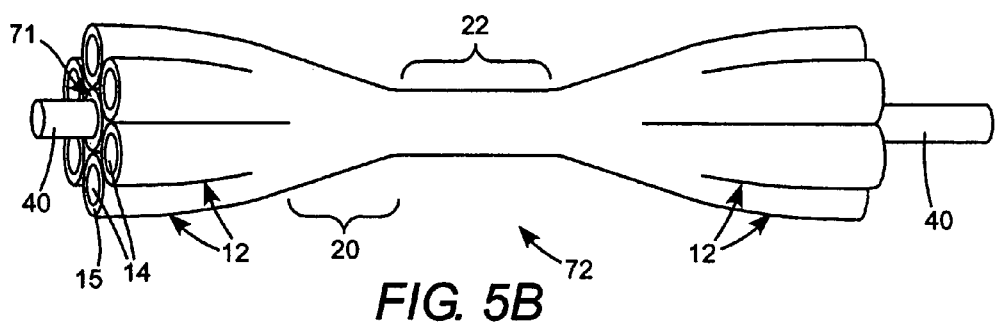
Figure 5C:
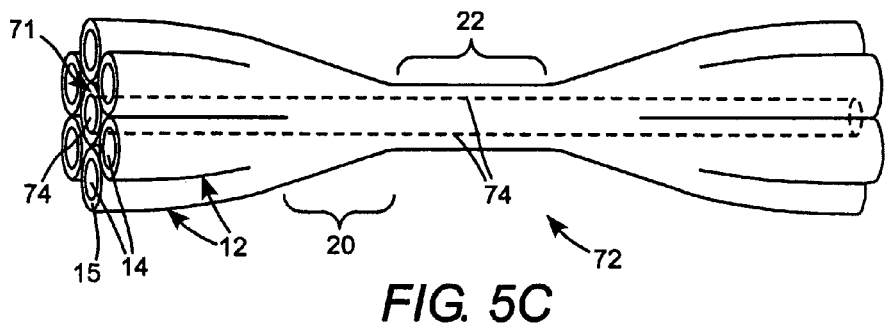
Figure 5D:
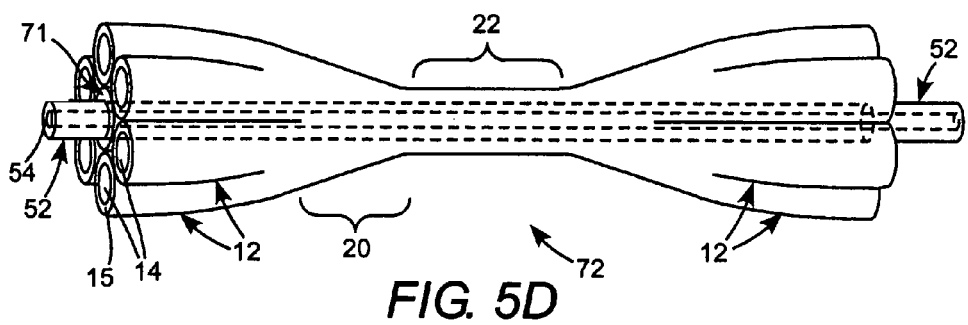
Figure 5E:
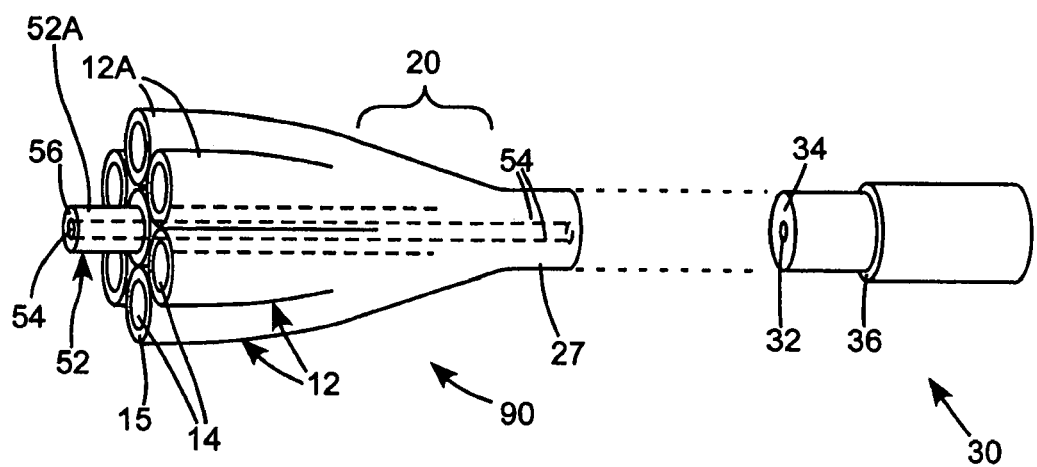
Figure 5F:
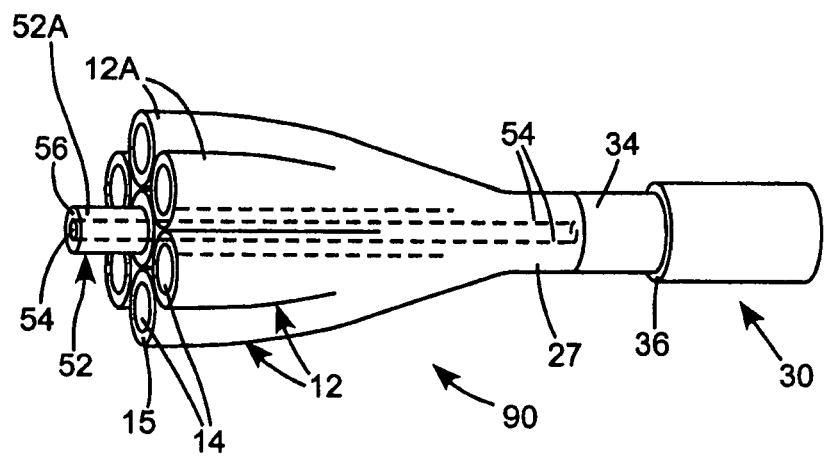

Straight portion 22 of the fused tapered bundle having the low-mode fiber 52 therein is then cleaved to yield at least one finished combiner 80 (see FIG. 4E). If low-mode fiber 52 extends completely through bundle 38 it is possible to produce two completed combiners as a result of the cleaving. In a completed combiner 80, end 52A of fiber 52 serves as a signal port or signal input port of the combiner. Ends 12A of individual fibers 12 provide pump light ports. Combiner 80 has a straight narrowest portion 27 thereof corresponding to a remaining portion of straight portion 22 of the uncleaved bi-tapered bundle and including low-mode fiber core 54. Narrowest portion 27 can be considered as a single length of low-mode fiber having a cladding comprising the original cladding 56 of the low-mode core fiber plus the fused-together original claddings 15 and cores 14 of multimode fibers 12. Combiner 80 can be coupled to a fiber amplifier 30 by butt splicing narrowest portion 27 of the combiner to the amplifier (see FIG. 4F).

A description of still another preferred embodiment of a method in accordance with the present invention for assembling a multimode pump-light fiber combiner including a signal-light carrying, low-mode core having the same diameter at input and output ends thereof is set forth below with reference to FIGS. 5A through 5F. First a bi-tapered bundle 72 having an aperture 74 extending therethrough is formed as described above with reference to FIGS. 3A-C (see FIGS. 5A-C). A low-mode fiber 52 having a core 54 surrounded by cladding 46 is then inserted through fused tapered bundle 72 via aperture 74 thereof (see FIG. 5D). The assembly of bundle 72 and fiber 52 is then selectively heated as described above to fuse fiber 52 to straight portion 22 of bundle 72. Straight portion 22 is then cleaved to yield a finished combiner 90 (see FIG. 5E). Combiner 90 can be coupled to a fiber amplifier 30 by butt splicing straight portion 25 of the combiner to the amplifier (see FIG. 5F).

Figure 6A:
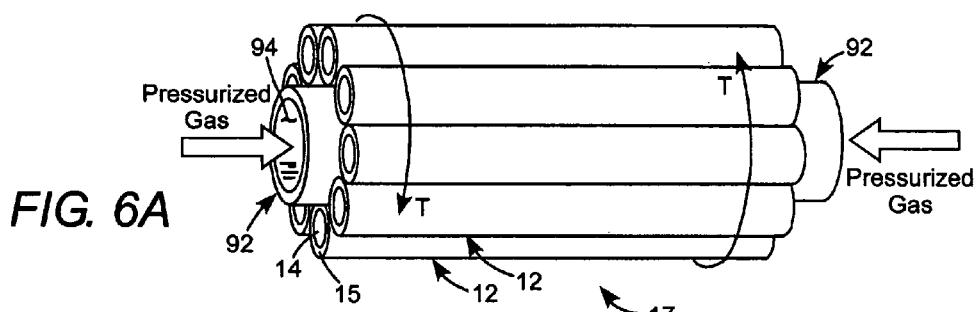
FIGS. 6A-D schematically illustrate steps in a further method in accordance with the present invention for making a multimode to low-mode combiner.
Figure 6B:
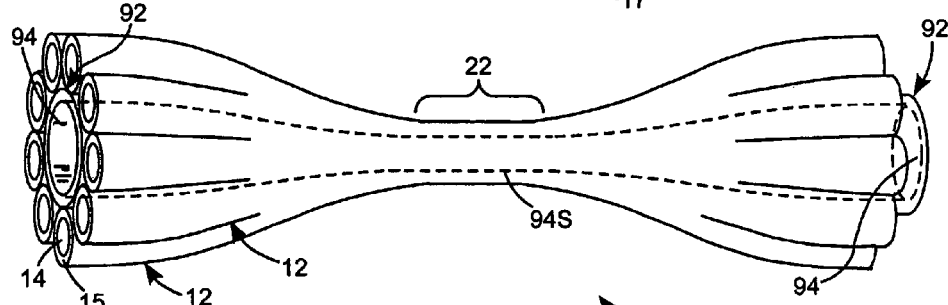
Figure 6C:
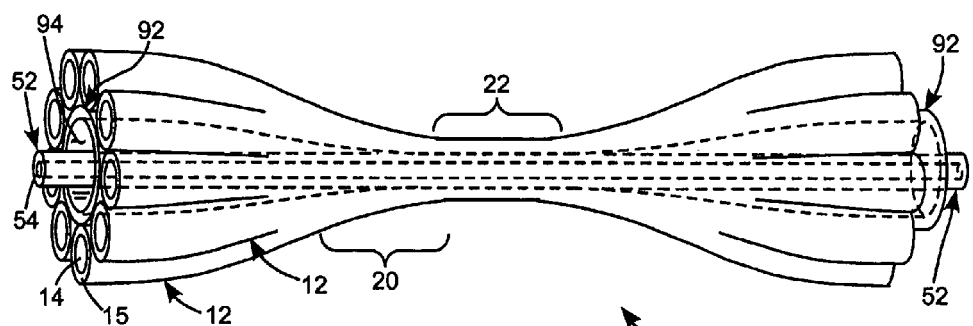
Figure 6D:
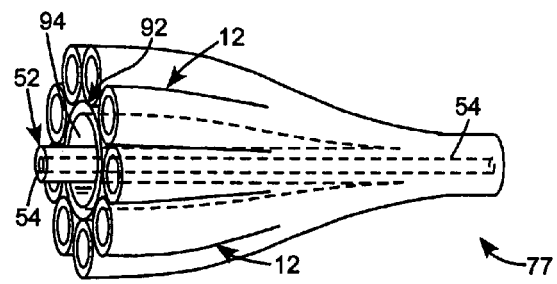

FIGS. 6A-D schematically illustrates steps in a further preferred embodiment of a method in accordance with the present invention for assembling a multimode pump-light fiber combiner. In one step of the inventive method (see FIG. 6A), nine multimode fibers 12 are grouped into a straight bundle 17, around a large diameter hollow fiber or capillary tube 92. A positive pressure is created in interior 94 of tube 92. The bundle of fibers 12 and tube 92 is pulled into a fused, bi-tapered bundle (see FIG. 6B) 77. Here again, a torque or twisting force is preferably applied to the fiber bundle as it is being pulled. Preferably a positive pressure is maintained in tube 92 until the fusing and tapering operation is complete. The positive pressure is applied by introducing a gas, preferably an inert gas such as nitrogen, under pressure, into interior 94 of the tube. This can be done from both ends of tube 92 as depicted in FIG. 6A. Alternatively, one end of the tube can be sealed and pressuring gas introduced at the opposite end. It is also possible to flow the pressuring gas from one end of the tube to the other, relying on the resistance to flow of the gas of the interior of the tube to build up the necessary positive pressure. If tube 90 has a sufficiently large diameter, this large diameter alone may be sufficient to prevent complete collapse of the tube in the drawing process, and the positive pressure can be dispensed with. By way of example an inside diameter of about eighty micrometers (80 µm) or greater may be sufficient to prevent complete collapse of the tube without application of positive pressure.

Bundle 77 has fused tapered portions 20, and a straight or narrowest portion 22. Narrowest portion 22 comprises fused-together claddings 15 and tapered distorted cores 14 of the original multimode fibers 12 fused together with tube 92. Tube 92 becomes tapered during formation of the tapered bundle, however, the positive pressure applied to interior 94 of the tube during the fusing and tapering operation prevents complete collapse of tube 92 thereby providing that there is a uniform diameter aperture 94S in straight portion 22 of the fused tapered bundle 77. Depending on the number of multimode fibers 12 and the desired diameter of straight portion 22 of the bi-tapered bundle, it may be found advantageous to pre-taper the multimode fibers before heating and tensioning the initial bundle. This can improve the symmetry of the arrangement of the bundled tapered fibers.

A fiber 52 having a low-mode core 54 is inserted into the bundle via a free end of tube 92. Fiber 52 extends at least through uniform aperture 94S and preferably completely through bundle 77 (see FIG. 6C). Bundle 77 and tube 92 therein are selectively heated as described above in other embodiments of the inventive method to fuse cladding 56 of fiber 52 to straight portion 22 of the bi-tapered bundle. Preferably, during this fusing operation, a slight negative pressure is applied to tube 94 via the free ends thereof. This assists the fusing of fiber 52 to the bundle. Once the fusing of fiber 52 is complete and the bundle and fiber have cooled, the fiber-containing bundle can be cleaved to provide at least one finished combiner 90 (see FIG. 6D). Combiner 90 can be spliced to a low mode amplifier fiber as described above.

One advantage of the method of FIGS. 6A-D over other above described embodiments of the inventive method is that it avoids potential contamination of fibers by microparticles of the metal of the wire used during tapered bundle formation in those methods. Any such particles could be increasingly problematical with increasing pump light power transmitted by a finished combiner. The particles could function as absorption centers and cause thermal damage in the straight portion of the combiner.

In one example of the method depicted in FIGS. 5A-F, a combiner was prepared using six fused-silica multimode fibers 12 each having an overall diameter of 220 micrometers (µm) and a core diameter of 200 µm. The fibers were bundled around a hollow fused silica fiber 70 having an overall diameter of about 220 µm and an inside diameter of about 130 µm. A tungsten wire 40 having a diameter of 127 µm and a length of about one meter was inserted through the hollow fiber. The bundle was heated around the midpoint thereof a temperature of about 1600° C. slightly above the softening point temperature of fused silica. A current of about 1.8 Amperes (A) was passed through the tungsten wire. The bundle was pulled into a bi-tapered bundle 72 having a diameter of about 400 µm in its narrowest point (straight section) 22. After cooling the bundle, the tungsten wire was extracted. A low-mode fiber 52 having an overall diameter of about 125.0 µm and a core diameter of about 30.0 µm was then inserted through the aperture 74 left by extraction of the wire. The straight portion the bi-tapered bundle with the low-mode fiber therein was heated to a temperature about 10° C. above the softening point of fused silica until the cladding of the low-mode fiber fused together with straight section 22 of the bi-tapered bundle. Straight section 22 was then cleaved to provide two combiners 90 in accordance with the present invention.

It should be noted here that while in embodiments of the inventive method described above either six or nine multimode fibers are used to provide pump light input ports of the combiner this should not be considered as limiting the inventive method. Bundling six multimode fibers has been found effective in providing optimum packing and fusing together of the multimode fibers. However, more or less multimode fibers may be combined without departing from the spirit and scope of the inventive method.

In summary, the present invention is described above in terms of a preferred and other embodiments. The invention is not limited, however, to the embodiments described and depicted. Rather, the invention is limited only by the claims appended hereto.

What is claimed is:

1. A method of forming an optical fiber combiner, comprising:

forming a bundle of multimode optical fibers into an elongated bi-tapered fiber bundle, said bi-tapered bundle having, at opposite ends thereof, free ends of said multimode fibers, said bi-tapered bundle, between said opposite ends thereof, having two fused tapered portions tapered into a single straight portion thereof, and said bi-tapered fiber bundle having an aperture extending longitudinally therethrough;

inserting an optical fiber having a low-mode core into said aperture-including bi-tapered bundle via said aperture therein, said low-mode-core optical fiber extending at least through said straight portion of said bi-tapered bundle;

heating said bi-tapered bundle having said low-mode-core fiber therein to a temperature such that said low-mode core optical fiber is fused to said straight portion of said bi-tapered bundle; and cleaving said straight portion of said bi-tapered bundle having said low-mode core optical fiber therein, thereby providing at least one single-tapered multi-mode optical fiber combiner, said optical fiber combiner having at one end thereof free ends of said multimode fibers and a free end of said low-mode core fiber, said multimode fibers being fused and tapered together into a single straight portion of the combiner at an opposite end thereof, said low-mode fiber core extending through the straight portion of the combiner.

2. The method of claim 1, wherein said elongated bi-tapered fiber bundle having said aperture extending therethrough is formed by forming a fiber bundle including a plurality of multimode optical fibers grouped around a metal wire, selectively heating said fiber bundle between said first and second ends thereof to a temperature below the softening point of the metal wire, but at which said multimode fibers will fuse together, tensioning said selectively heated fiber bundle to form said bi-tapered fiber bundle, cooling said bi-tapered bundle, and extracting said metal wire from said bi-tapered fiber bundle thereby leaving said aperture extending through said bi-tapered bundle.

3. The method of claim 1, wherein said elongated bi-tapered fiber bundle having said aperture extending therethrough is formed by forming a fiber bundle including a plurality of multimode optical fibers grouped around a capillary tube through which a metal wire is inserted, selectively heating said fiber bundle between said first and second ends thereof to a temperature below the softening point of the metal wire, but at which said multimode fibers and said capillary tube will fuse together, tensioning said selectively heated fiber bundle to form said bi-tapered fiber bundle, cooling said bi-tapered bundle, and extracting said metal wire from said bi-tapered fiber bundle thereby leaving said aperture extending through said bi-tapered bundle.

4. The method of claim 1, wherein said elongated bi-tapered fiber bundle having said aperture extending therethrough is formed by forming a fiber bundle including a plurality of multimode optical fibers grouped around a capillary tube, while applying a positive pressure to the interior of said capillary tube, selectively heating said fiber bundle between said first and second ends thereof to a temperature at which said multimode fibers and said capillary tube will fuse together, tensioning said selectively heated fiber bundle to form said bi-tapered fiber bundle, with said positive pressure preventing said capillary tube from collapsing during said tensioning, then cooling said bi-tapered bundle thereby leaving said aperture extending through said bi-tapered bundle.

5. The method of claim 1, wherein said elongated bi-tapered fiber bundle having said aperture extending therethrough is formed by forming a fiber bundle including a plurality of multimode optical fibers grouped around a capillary tube, selectively heating said fiber bundle between said first and second ends thereof to a temperature at which said multimode fibers and said capillary tube will fuse together, tensioning said selectively heated fiber bundle to form said bi-tapered fiber bundle, and wherein said capillary tube has an inside diameter sufficiently large that said capillary tube does not completely collapse during said tensioning, then cooling said bi-tapered bundle thereby leaving said aperture extending through said bi-tapered bundle.

6. The method of claim 5, wherein said capillary tube has an inside diameter of about 80 micrometers or greater.

7. A method of forming an optical fiber combiner, comprising:

forming a fiber bundle including a plurality of multimode optical fibers grouped around a metal wire, said fiber bundle having first and second opposite ends;

selectively heating said fiber bundle between said first and second ends thereof to a temperature below the softening point of the metal wire, but at which said multimode fibers will fuse together;

tensioning said selectively heated fiber bundle to form a bi-tapered fiber bundle, said bi-tapered bundle having, at opposite ends thereof, free ends of said multimode fibers, said bi-tapered bundle, between said opposite ends thereof, having two fused tapered portions tapering toward a narrowest portion thereof;

cooling said bi-tapered bundle;

extracting said metal wire from said bi-tapered fiber bundle thereby leaving an aperture extending through said bi-tapered bundle;

inserting an optical fiber having a low-mode core into said aperture-including bi-tapered bundle via said aperture therein, said low-mode-core optical fiber extending at least through said straight portion of said bi-tapered bundle;

heating said bi-tapered bundle having said low-mode-core fiber therein to a temperature such that said low-mode core optical fiber is fused to said straight portion of said bi-tapered bundle; and cleaving said straight portion of said bi-tapered bundle having said low-mode core optical fiber therein, thereby providing at least one single-tapered multi-mode optical fiber combiner, said optical fiber combiner having at one end thereof free ends of said multimode fibers and a free end of said low-mode core fiber, said multimode fibers being fused and tapered together into a single straight portion of the combiner at an opposite end thereof, and said low-mode fiber core extending through the straight portion of the combiner.

8. The method of claim 7, wherein a twisting force is applied to said fiber bundle before said selective heating.

9. The method of claim 7, wherein said metal wire is independently heated during said heating of said fiber bundle.

10. The method of claim 9, wherein said independent heating of said metal wire is effected by passing an electrical current through said metal wire.

11. The method of claim 7, wherein said metal wire is formed from a material having a higher coefficient of expansion than that of the material of said multimode optical fibers.

12. The method of claim 11, wherein said metal is formed from a material selected from the group consisting of platinum and tungsten.

13. The method of claim 12, wherein said metal wire is a tungsten wire.

14. A method of forming an optical fiber combiner, comprising:

forming a fiber bundle including a plurality of multimode optical fibers grouped around a capillary tube having a metal wire extending therethrough, said fiber bundle having first and second opposite ends;

selectively heating said fiber bundle between said first and second ends thereof to a temperature below the softening point of the metal wire, but at which said multimode fibers and said capillary tube will fuse together;

tensioning said selectively heated fiber bundle to form a bi-tapered fiber bundle, said bi-tapered bundle having, at opposite ends thereof, free ends of said multimode fibers, said bi-tapered bundle, between said opposite ends thereof, having two fused tapered portions tapering toward a narrowest portion thereof;

cooling said bi-tapered bundle;

extracting said metal wire from said capillary tube thereby leaving an aperture extending through said bi-tapered bundle;

inserting an optical fiber having a low-mode core into said aperture-including bi-tapered bundle via said aperture therein, said low-mode-core optical fiber extending at least through said straight portion of said bi-tapered bundle;

heating said bi-tapered bundle having said low-mode-core fiber therein to a temperature such that said low-mode core optical fiber is fused to said straight portion of said bi-tapered bundle; and cleaving said straight portion of said bi-tapered bundle having said low-mode core optical fiber therein, thereby providing at least one single-tapered multimode optical fiber combiner, said optical fiber combiner having at one end thereof free ends of said multimode fibers and a free end of said low-mode core fiber, said multimode fibers being fused and tapered together into a single straight portion of the combiner at an opposite end thereof, and said low-mode fiber core extending through the straight portion of the combiner.

15. The method of claim 14, wherein a twisting force is applied to said fiber bundle before said selective heating.

16. The method of claim 14, wherein said metal wire is independently heated during said heating of said fiber bundle.

17. The method of claim 16, wherein said independent heating of said metal wire is effected by passing an electrical current through said metal wire.

18. The method of claim 14, wherein said metal wire is formed from a material having a higher coefficient of expansion than that of the material of said multimode optical fibers.

19. The method of claim 16, wherein said metal is formed from a material selected from the group consisting of platinum and tungsten.

20. The method of claim 18, wherein said metal wire is a tungsten wire.

21. A method of forming an optical fiber combiner, comprising:

forming a fiber bundle including a plurality of multimode optical fibers grouped around a capillary tube, said fiber bundle having first and second opposite ends;

while applying positive pressure to the interior of said capillary tube, selectively heating said fiber bundle between said first and second ends thereof to a temperature at which said multimode fibers and said capillary tube will fuse together;

while continuing to apply said positive pressure to the interior of said capillary tube, tensioning said selectively heated fiber bundle to form a bi-tapered fiber bundle, said bi-tapered bundle having, at opposite ends thereof, free ends of said multimode fibers, said bi-tapered bundle, between said opposite ends thereof, having two fused tapered portions tapering toward a narrowest portion thereof, said positive pressure preventing said capillary tube from collapsing thereby leaving an aperture extending through said bi-tapered fiber bundle;

cooling said bi-tapered bundle;

inserting an optical fiber having a low-mode core into said aperture-including bi-tapered bundle via said aperture therein, said low-mode-core optical fiber extending at least through said straight portion of said bi-tapered bundle;

heating said bi-tapered bundle having said low-mode-core fiber therein to a temperature such that said low-mode core optical fiber is fused to said straight portion of said bi-tapered bundle; and cleaving said straight portion of said bi-tapered bundle having said low-mode core optical fiber therein, thereby providing at least one single-tapered multimode optical fiber combiner, said optical fiber combiner having at one end thereof free ends of said multimode fibers and a free end of said low-mode core fiber, said multimode fibers being fused and tapered together into a single straight portion of the combiner at an opposite end thereof, and said low-mode fiber core extending through the straight portion of the combiner.

22. A method of forming an optical fiber combiner, comprising:

forming a fiber bundle including a plurality of multimode optical fibers grouped around a metal wire, said fiber bundle having first and second opposite ends;

selectively heating said fiber bundle between said first and second ends thereof to a temperature below the softening point of the metal wire, but at which said multimode fibers will fuse together;

tensioning said selectively heated fiber bundle to form a bi-tapered fiber bundle, said bi-tapered bundle having, at opposite ends thereof, free ends of said multimode fibers, said bi-tapered bundle, between said opposite ends thereof, having two fused tapered portions tapering toward a narrowest portion thereof;

cooling said bi-tapered bundle;

extracting said metal wire from said bi-tapered fiber bundle thereby leaving an aperture extending through said bi-tapered bundle;

cleaving said bi-tapered bundle in said narrowest portion thereof to provide a single-tapered fiber bundle said single tapered fiber bundle having said aperture extending therethrough; and inserting an optical fiber having a low-mode core into said aperture-including single-tapered bundle via said aperture therein to form a single-tapered multimode optical fiber combiner, said optical fiber combiner having at one end thereof free ends of said multimode fibers and a free end of said low-mode core fiber and having at an opposite end thereof a single straight portion having said low-mode-core optical fiber therein.

23. The method of claim 22, wherein a twisting force is applied to said fiber bundle before said selective heating.

24. The method of claim 22, wherein said metal wire is independently heated during said heating of said fiber bundle.

25. The method of claim 24, wherein said independent heating of said metal wire is effected by passing an electrical current through said metal wire.

26. A method of forming an optical fiber combiner, comprising:

forming a fiber bundle including a plurality of multimode optical fibers grouped around a hollow optical fiber having a metal wire extending therethrough, said fiber bundle having first and second opposite ends;

selectively heating said fiber bundle between said first and second ends thereof to a temperature below the softening point of the metal wire, but at which said multimode fibers and said hollow fiber will fuse together;

tensioning said selectively heated fiber bundle to form a bi-tapered fiber bundle, said bi-tapered bundle having, at opposite ends thereof, free ends of said multimode fibers, said bi-tapered bundle, between said opposite ends thereof, having two fused tapered portions tapering toward a narrowest portion thereof;

cooling said bi-tapered bundle;

extracting said metal wire from said bi-tapered fiber bundle thereby leaving an aperture extending through said bi-tapered bundle;

cleaving said bi-tapered bundle in said narrowest portion thereof to provide a single-tapered fiber bundle said single tapered fiber bundle having said aperture extending therethrough; and inserting an optical fiber having a low-mode core into said aperture-including single-tapered bundle via said aperture therein to form a single-tapered multimode optical fiber combiner, said optical fiber combiner having at one end thereof free ends of said multimode fibers and a free end of said low-mode core fiber and having at an opposite end thereof a single straight portion having said low-mode-core optical fiber therein.

27. The method of claim 26, wherein a twisting force is applied to said fiber bundle before said selective heating.

28. The method of claim 26, wherein said metal wire is independently heated during said heating of said fiber bundle.

29. The method of claim 28, wherein said independent heating of said metal wire is effected by passing an electrical current through said metal wire.

* * * * *